United States Patent

[11] 3,598,424

| [72] | Inventors | Stephen J. Crouch;<br>Peter W. R. Stubbs; Michael W. Lewis, all of Warwick, England |
|---|---|---|
| [21] | Appl. No. | 851,245 |
| [22] | Filed | Aug. 19, 1969 |
| [45] | Patented | Aug. 10, 1971 |
| [73] | Assignee | The Rover Company Limited<br>Solihull, Warwickshire, England |
| [32] | Priority | Aug. 20, 1968 |
| [33] | | Great Britain |
| [31] | | 39773/68 |

[54] CONTROL UNIT FOR VEHICLE SUSPENSIONS
7 Claims, 3 Drawing Figs.

[52] U.S. Cl. ................................................ 280/124 F,
                                                    280/6 H
[51] Int. Cl. ............................................... B60g 21/06
[50] Field of Search ........................................ 267/22, 64
            B; 280/6, 6.1, 6 H, 124, 124 F; 188/93

[56] References Cited
UNITED STATES PATENTS

| 2,905,430 | 9/1959 | Deist ........................ | 280/124 FX |
| 3,002,765 | 10/1961 | MacDuff .................. | 280/124 F |
| 3,181,853 | 5/1965 | Howell .................... | 280/124 FX |

*Primary Examiner*—Duane A. Reger
*Attorney*—Scrivener, Parker, Scrivener and Clarke ABSTRACT: A control unit for an active vehicle suspension system of the kind in which hydraulic struts acting on the wheel suspension linkages are in series with springs and have hydraulic fluid fed to and from them in response to vehicle body movements comprises a pendulum device connected to a rotary damper which is in parallel with a spring. The body of the damper is rotatably mounted in bearings in a mounting plate for securing to the vehicle bodywork and adapted to be rotated by movements of the suspension linkage and the damper spindle carries the pendulum and acts on hydraulic valves controlling the fluid flow. The spring can be a leaf spring interconnecting the damper body and the pendulum.

CONTROL UNIT FOR VEHICLE SUSPENSIONS

This invention relates to a control unit for use in so-called 'active' vehicle suspension systems, that is to say, suspension systems in which the effective height of the suspension is varied by supply or withdrawal of fluid under pressure to a strut in the suspension to cause correction of the attitude of the vehicle bodywork under dynamic conditions. Such a suspension system forms the subject of British Pat. No. 985,869 of Automotive Products Company Limited and a further development of it forms the subject of their pending British Pat. application No. 2112/68 filed on 15 Jan. 1968. A suspension system of the same general class is disclosed in U.S. Pat. No. 2,849,225 of Rene Lucien.

In the suspension system of British Pat. application No. 2112/68 there is disclosed a control unit for such a system comprising a pendulum mounted on the vehicle bodywork, i.e. on the spring mass, and acting on valves controlling the supply of hydraulic fluid to and from an associated strut in a wheel suspension linkage. The pendulum is acted on by inertia forces and is also connected to the suspension linkage itself through a link that feeds back to the pendulum information on the movement of the linkage. The connecting link comprises a spring and a damper acting in parallel.

In our copending British Pat. application No. 39773/68 we have described a complete active suspension system designed to oppose or counteract altogether roll of the vehicle bodywork or spring mass and employing such pendulum-type control units.

The aim of the present invention is to provide an improved form of pendulum-type control unit for an active vehicle suspension system. According to the invention such a unit comprises a rotary damper having two relatively rotatable parts of which the relative movement is opposed to a degree varying with velocity, for example by means of a viscous fluid between the parts, the damper being mounted for rotation as a whole with respect, for example, to the vehicle bodywork on which it is mounted, and a pendulum being connected to one of the parts of the damper for rotation therewith, whilst the other part of the damper has a link adapted to be connected to the associated vehicle suspension linkage to cause rotation of that part in relation to suspension linkage movement, and a spring further interconnecting the two parts of the damper.

In this way we obtain a control unit of the desired characteristics in a simple and compact form, that is to a pendulum sensitive to accelerations and capable of connection to the suspension linkage through a spring link in parallel with a damping link. The spring need not be connected directly between the two parts of the damper itself but could equally well be between the pendulum and the other part.

The unit is not limited in its use to suspensions counteracting only roll. It can sense accelerations in any direction according to its manner of mounting and it can control one or more struts, according to the arrangement of the valve or valves on which the pendulum acts.

The invention will now be further described by way of example with reference to the accompanying drawings, in which.

Figure 1:
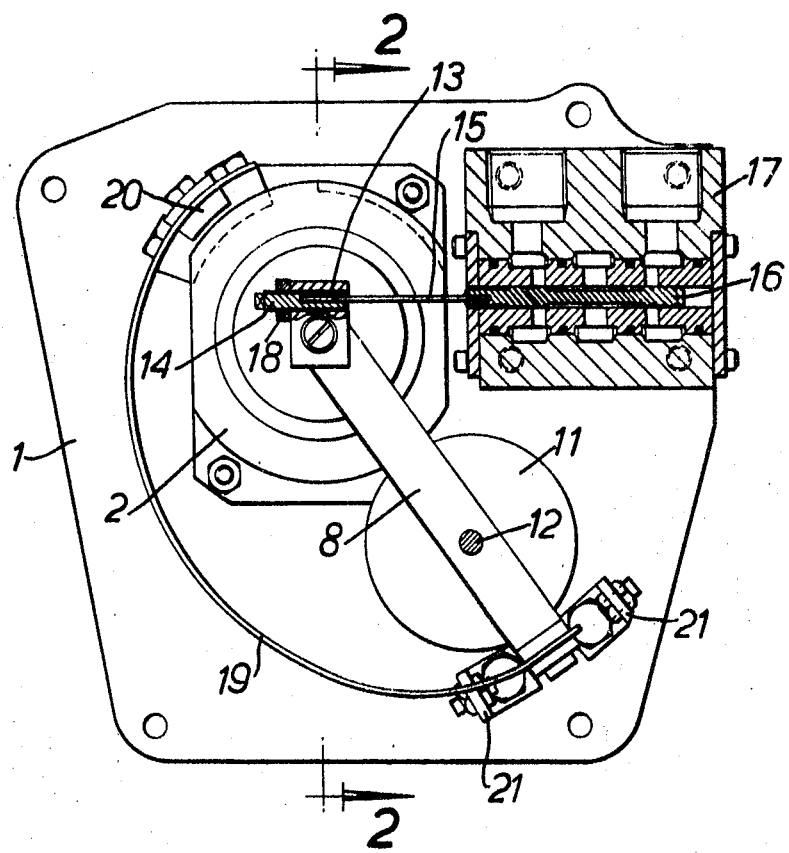
FIG. 1 is a partly sectioned elevation of the unit, looking along the pivotal axis.
Figure 2:
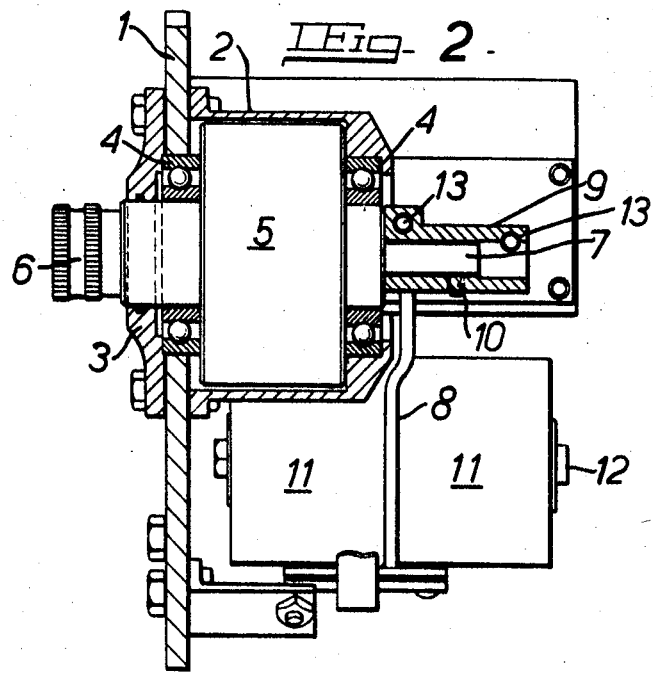
FIG. 2 is a vertical section on the line 2–2 in FIG. 1.

The unit comprises a mounting plate 1 provided with holes for securing it to the sprung mass or bodywork of a vehicle, and having bolted to it a casing 2 and a cover plate 3. Within the resulting enclosure are mounted spaced ball bearings 4 which receive the two end portions of the body 5 of a rotary damper. One end of the body of the damper projects through the cover plate 3 to form a splined stub shaft 6 (FIG. 2). This stub shaft provides a mounting for a lever (not shown) adapted to be connected to a convenient point in the suspension linkage of an associated wheel of the wheel, so as to turn the entire body of the damper about its axis in accordance with movements of the suspension linkage relative to the vehicle bodywork.

The damper can be of a known rotary type with a vaned rotor mounted inside the body and connected to a spindle 7 projecting from the opposite end of the body from the end 6. A viscous fluid within the body resists relative angular movement between the body and rotor to a degree dependent on the speed of rotation. A suitable damper is that sold under the registered trade mark "Kinetrol."

A pendulum arm 8 carries a sleeve 9 by which the arm can be mounted on the spindle 7 and locked in any angular position by grub-screw 10. The free end of the arm carries a pair of massive bob-weights 11 for example of lead, clamped to it by a bolt 12.

The sleeve 9 is of rectangular cross section and has two axial spaced tangential screw-threaded bores 13 to receive threaded plungers 14 carrying stiff wire push-rods 15 which convert the angular movement of the arm 8 into linear movement of the spool-shaped valve members 16 of hydraulic valves in a valve block 17. Rotation of the plungers 14 allows fine adjustment of the neutral positions of the valve members and the plungers can then be secured by locknuts 18. The valves in the block 17 control the flow of hydraulic fluid under pressure to and from the associated struts of the suspension system to be controlled by the unit described.

Acting effectively in parallel with the damper is a leaf spring 19 secured at one end to a bracket 20 on the body 5 of the damper and at its other end to the free end of the pendulum arm 8. While, the damper applies to the arm 8 a torque proportional to the velocity of movement of the suspension linkage, the leaf spring 19 applies a torque proportional to the displacement of the linkage.

The total travel of the arm 8 necessary to cause full actuation of the valves in each direction is very small and the travel is limited by stops 21 on the mounting plate.

Figure 3:
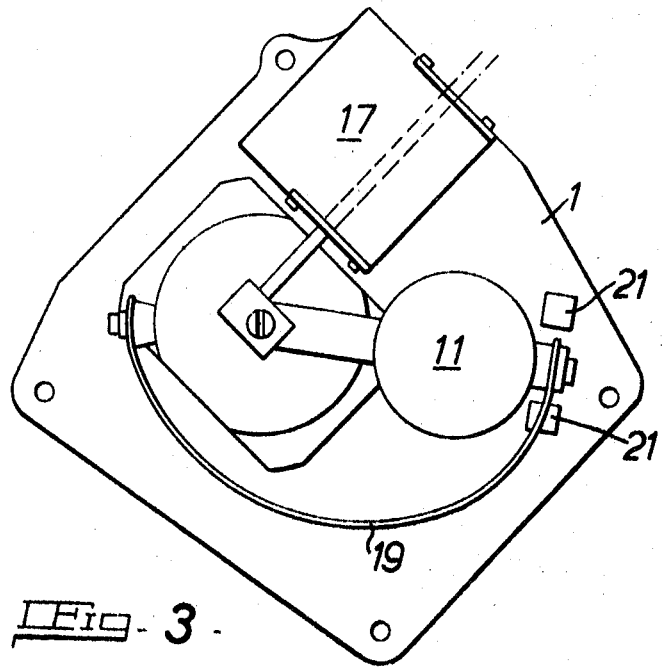
FIG. 3 is a somewhat simplified outside elevation similar to FIG. 1 but showing the unit turned to an angular position suitable for sensing lateral acceleration.

Although the pendulum arm 8 is influenced, through the damper 5 and spring 19, by the speed and displacement of the suspension linkage, its primary function is to respond to inertia forces arising through acceleration of the bodywork or other sprung mass to which the mounting plate 1 is secured, and its response will depend on the attitude in which it is mounted. FIG. 3 shows one possible position, in which the pivotal axis is in a horizontal plane and the arm 8 is at an inclination slightly below the horizontal. At first sight it would seem that such a layout would be sensitive to vertical accelerations, but when the unit is mounted on the sprung mass of a vehicle and that sprung mass receives an upward acceleration, imparted to it through the suspension linkage, as a wheel goes over a bump, the movement of the suspension linkage itself will influence the arm 8 through the damper 5 and spring 19. If the overall dynamic system comprising the bob-weights 11, the spring 19 and the damper 5 is made a miniature replica of the vehicle suspension system comprising the sprung mass (the vehicle bodywork) together with the suspension springs and dampers, it is possible to arrange that vertical acceleration on passing over a bump or pothole produce no angular movement of the arm 8. It does, however, respond to horizontal accelerations and if the unit is mounted with its pivotal axis parallel to the direction of travel the acceleration to which it responds will be those arising when the vehicle goes round a bend. However, the unit could be mounted with its pivotal axis transverse to the direction of travel, so as to respond to acceleration or braking of the vehicle, or its axis could be inclined so that the unit responds to both factors. A further possibility is for the axis to be tilted, i.e. not in a horizontal plane. The attitude of the unit will be determined by the factors it is to respond to and the kind of suspension it is to control.

We claim:

1. A control unit for fluid-pressure-actuated active vehicle suspension systems comprising a rotary damper made up of first and second relatively rotatable parts and a damping medium opposing relative rotation therebetween, a pendulum fast with the first of said parts, mounting plate, bearing means rotatably supporting said damper on said mounting plate, means on the second of said parts adapted for connection to a moving part of a vehicle suspension linkage, and spring means interconnecting said first and second parts.

2. A control unit as set forth in claim 1 wherein said spring extends between said second part of the damper and said pendulum.

3. A control unit as set forth in claim 1 wherein said spring is a leaf spring.

4. A control unit as set forth in claim 1 including a valve block on said mounting plate, a valve member movable in said valve block, and an operative connection between said pendulum and said valve member.

5. A control unit as set forth in claim 4 wherein said operative connection comprises a rod extending tangentially with respect to the axis of movement of said pendulum.

6. A control unit as set forth in claim 1 wherein said first part of the damper comprises a rotor and said second part comprises a damper body housing said rotor, said damper body being rotatably supported in said bearing means.

7. A vehicle having a suspension system including a vehicle connected to a sprung mass through a movable suspension linkage, a control unit as set forth in claim 1 mounted on said sprung mass, and an operative connection between said second damper part and said suspension linkage.